US010587655B1

(12) United States Patent
Perry

(10) Patent No.: US 10,587,655 B1
(45) Date of Patent: *Mar. 10, 2020

(54) COMPLIANCE MANAGEMENT SYSTEM AND METHOD FOR AN INTEGRATED COMPUTING SYSTEM

(71) Applicant: VCE IP Holding Company LLC, Richardson, TX (US)

(72) Inventor: Brian Perry, Murphy, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,085

(22) Filed: Oct. 25, 2018

Related U.S. Application Data

(63) Continuation of application No. 15/353,561, filed on Nov. 16, 2016, now Pat. No. 10,135,874.

(51) Int. Cl.
*H04L 29/06* (2006.01)
*H04L 12/24* (2006.01)
*H04L 29/08* (2006.01)

(52) U.S. Cl.
CPC ............ *H04L 63/20* (2013.01); *H04L 41/044* (2013.01); *H04L 67/10* (2013.01)

(58) Field of Classification Search
CPC ........ H04L 63/20; H04L 41/044; H04L 67/10
See application file for complete search history.

(56) References Cited

U.S. PATENT DOCUMENTS

| 9,065,746 | B2 | 6/2015 | Dolinsky et al. |
| 9,342,784 | B1 | 5/2016 | Rajagopal et al. |
| 9,485,145 | B1 | 11/2016 | Bonczkowski et al. |
| 10,135,874 | B1 * | 11/2018 | Perry ..................... H04L 63/20 |
| 2005/0080811 | A1 * | 4/2005 | Speeter ................ H04L 67/125 |
| 2013/0283336 | A1 * | 10/2013 | Macy .................... G06F 21/577 |
| | | | 726/1 |
| 2014/0059196 | A1 | 2/2014 | Onffroy et al. |
| 2014/0223176 | A1 * | 8/2014 | Hajost ................ H04L 63/0428 |
| | | | 713/165 |

(Continued)

*Primary Examiner* — Christopher A Revak
(74) *Attorney, Agent, or Firm* — Polsinelli PC

(57) ABSTRACT

A integrated computing system compliance management system includes a computer-based system to obtain an integrated computing system object instance of an integrated computing system that is generated from an object model comprising a unified entity representing the integrated computing system. The integrated computing system object instance has multiple hierarchally arranged sub-object instances representing hierarchally arranged resources of the integrated computing system. The system receive security hardening policies associated with an established security hardening standard, modify those sub-object instances to include the security hardening policies that are associated with those sub-object instances to form a security hardening-based object instance. Using the security hardening-based object instance, the system determines, for each security hardening policy, whether the configuration of the resources meets the security hardening policy using the security hardening-based object instance. Once determined, the system may then output the result of the determination.

18 Claims, 13 Drawing Sheets

(56) References Cited

U.S. PATENT DOCUMENTS

| | | | | |
|---|---|---|---|---|
| 2014/0325042 | A1* | 10/2014 | Croy | H04L 41/082 709/221 |
| 2015/0128152 | A1* | 5/2015 | Lachaume | G06F 9/465 719/316 |
| 2015/0193474 | A1* | 7/2015 | Deng | G06F 16/21 707/694 |
| 2015/0193629 | A1* | 7/2015 | Hajost | G06F 21/602 713/189 |
| 2016/0359906 | A1* | 12/2016 | Lam | H04L 63/20 |
| 2016/0359907 | A1* | 12/2016 | Lam | H04L 63/20 |
| 2016/0359908 | A1* | 12/2016 | Lam | H04L 63/20 |
| 2017/0244761 | A1* | 8/2017 | Baukes | H04L 41/0816 |
| 2017/0322732 | A1* | 11/2017 | Lissone | G06F 21/604 |
| 2017/0359379 | A1* | 12/2017 | Elliot | G06F 21/60 |
| 2018/0034856 | A1* | 2/2018 | Mallya | H04L 63/20 |

* cited by examiner

| UNIQUE NAME | STRUCTURED NAME | LONG FORM DESCRIPTION | VULNERABILITY RISK | ANCILLARY STANDARD ENTITY | AFFECTED RESOURCE |
|---|---|---|---|---|---|
| Disable-disk-shrinking | SEC101001.2 | Disable disk shrinking feature for virtual disks from non-administrative users | Shrinking a virtual disk may leave mapped storage data vulnerable to theft. | Ensure disk shrinking is disabled | VM Hypervisor |
| Limit-console-connections | SEC101002.1 | Limit sharing of console connections | By default, remote console sessions can be provided to only 1 user at a time | Ensure clipboard is not shareable | VM Hypervisor |
| Disable-console-drag-n-drop | SEC101003.1 | Explicitly disable copy/paste operations | Information may be improperly disclosed via console cut/paste operations | Ensure clipboard is not shareable | VM Hypervisor |
| Disable-console-copy | SEC101003.2 | Explicitly disable copy/paste operations | Information may be improperly disclosed via console cut/paste operations | Ensure clipboard is not shareable | VM Hypervisor |
| CIMC.SSH.Session.time-out | SEC301230.1 | Set SSH authentication session timeout to 15 minutes. | An attacker may make repeated attempts to authenticate without detection. | Ensure SSH authentication session timeout is set to 15 minutes. | Compute |
| VMAX.SYMACL.configure | SEC401114.1 | Allow only trusted hosts to connect to and manage the array(s) | shared systems may be vulnerable to a host accidentally or intentionally tampering with another's devices. | Ensure that only trusted hosts are allowed to connect to and manage the array(s) | Storage |
| ... | ... | | | | |
| Isilon.Banner.config | SEC404400.1 | Configure a logon banner for secured systems | An attacker may claim they were unaware that they are accessing a secured system | Enable an appropriate logon banner for the secured system | Storage |

FIG. 8

COMPLIANCE MANAGEMENT SYSTEM AND METHOD FOR AN INTEGRATED COMPUTING SYSTEM

CROSS-REFERENCE TO RELATED APPLICATION

This continuation patent application claims priority to U.S. Nonprovisional application Ser. No. 15/353,561 entitled "COMPLIANCE MANAGEMENT SYSTEM AND METHOD FOR AN INTEGRATED COMPUTING SYSTEM," filed on Nov. 16, 2016 the entire contents of which is incorporated herein by reference for all purposes.

TECHNICAL FIELD

Aspects of the present disclosure relate to computing devices and, in particular, to a compliance management system and method for an integrated computing system.

BACKGROUND

Computing environments used by enterprises, such as corporations and universities, are often provided by multiple computing devices that function in a collaborative manner to meet the computing resource needs of the enterprise. With the advent of the cloud computing and increased needs for stable computing, computing environments, such as converged infrastructures, were introduced and that provide a standardized package of resources combined into a single, optimized computing solution with a relatively high level of customization. Nevertheless, this high level of customization presents challenges to administrators to ensure that the computing system meets certain minimum requirements, such as security, availability and performance requirements both at initial system deployment and operationally over the duty cycle of the system.

SUMMARY

According to one aspect of the present disclosure, an integrated computing system compliance management system includes a computer-based system to obtain an integrated computing system object instance of an integrated computing system that is generated from an object model comprising a unified entity representing the integrated computing system. The integrated computing system object instance has multiple hierarchally arranged sub-object instances representing hierarchally arranged resources of the integrated computing system. The system receive security hardening policies associated with an established security hardening standard, modify those sub-object instances to include the security hardening policies that are associated with those sub-object instances to form a security hardening-based object instance. Using the security hardening-based object instance, the system determines, for each security hardening policy, whether the configuration of the resources meets the security hardening policy using the security hardening-based object instance. Once determined, the system may then output the result of the determination.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

FIG. 8 illustrates an example security hardening policy display/edit screen that may be used to display the security hardening policies of a certain security hardening standard and/or to edit those security hardening policies by a user of the system according to one embodiment of the present disclosure.

DETAILED DESCRIPTION

Embodiments of the present disclosure provide an integrated computing system compliance management system and method that verifies an integrated computing system for compliance against one or more security hardening standards using a security hardening-based object instance representing the integrated computing system. While conventional compliance management systems may provide a standardized technique for ensuring compliance of resources, they only function within the scope of individual resources of the integrated computing system, and often do not manage compliance against integrated computing systems whose resources may change often over time. That is, conventional compliance management systems are generally static in that they cannot react to frequent, ongoing changes to the resources, such as the addition of new resources, the deletion of existing resources, and/or the modification of existing resources in the context of an integrated system. Embodiments of the present disclosure provide a solution to these problems, among other problems, by providing an integrated computing system compliance management system that ensures compliance of the integrated computing system using a security hardening-based object instance that can verify for compliance against one or more security hardening policies of a security hardening standard, and can be readily obtained to account for variances that may occur in the integrated computing system over extended periods of time.

Compliance verification of resources against certain policies, such as performance and security policies, is a key element for organizations, particularly those that operate in, or interface with regulated industries. For example, an organization may implement a policy dictating that a particular database is confidential to the extent that it is only accessible from one or a few specified login accounts in the organization's computing environment. Nevertheless, this policy may be difficult to enforce when the organization uses an integrated computing system whose resources, which are used to access that database, change frequently over time. In most cases, the compliance of these integrated computing systems should be maintained regardless of how the integrated computing system's configuration changes over time. However, conventional compliance management systems that use static approaches to compliance management often do not scale well to larger systems in which the required configuration for every resource in the integrated computing system is individually specified, and may in some cases, cease to function in a highly configurable integrated computing system where resources can appear and disappear, often in very short time periods, based on workload, service level agreement (SLA) requirements, and other performance criteria specified for the application.

Figure 1A:
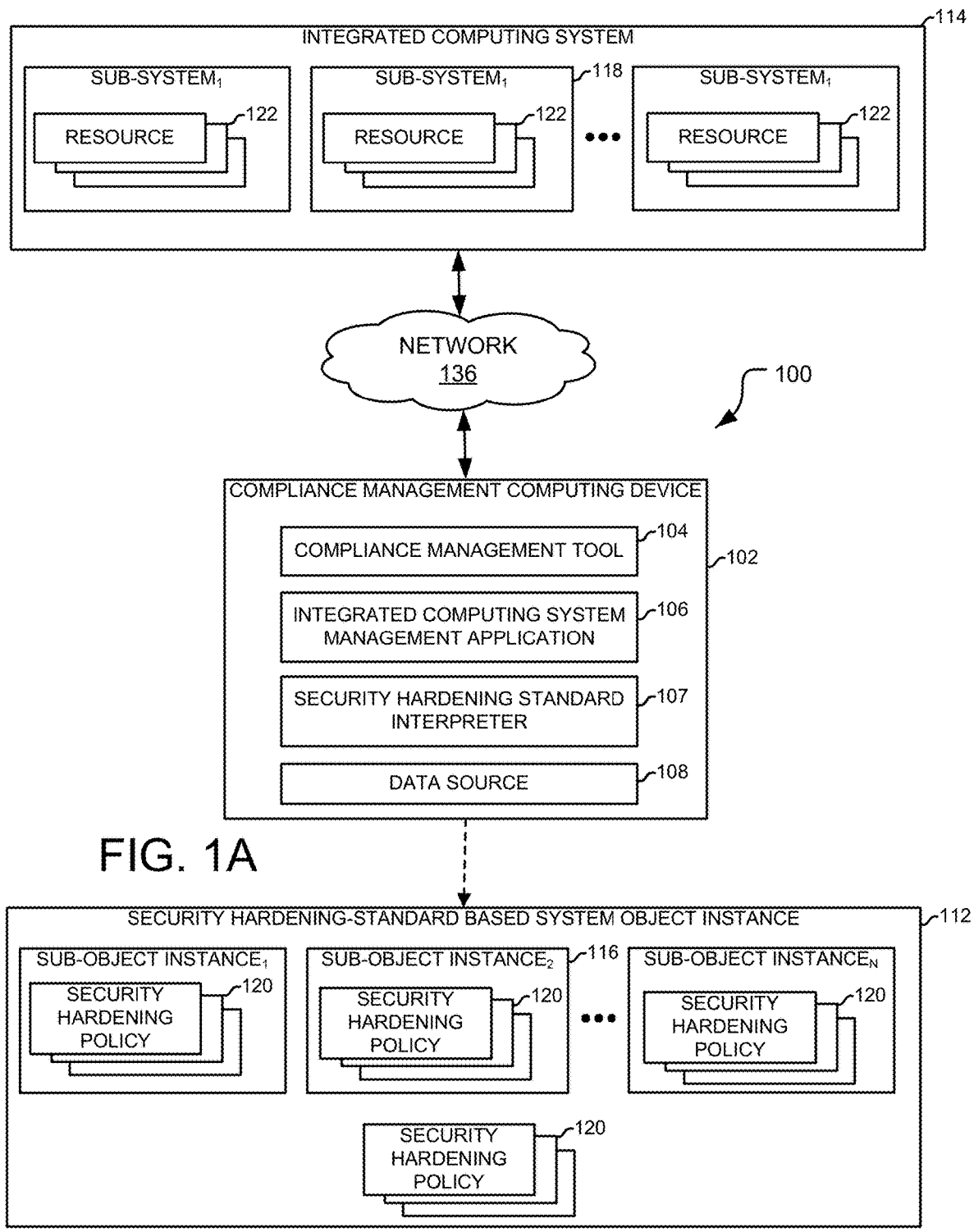
FIGS. 1A and 1B illustrate an example compliance management system according to one embodiment of the present disclosure.
Figure 1B:
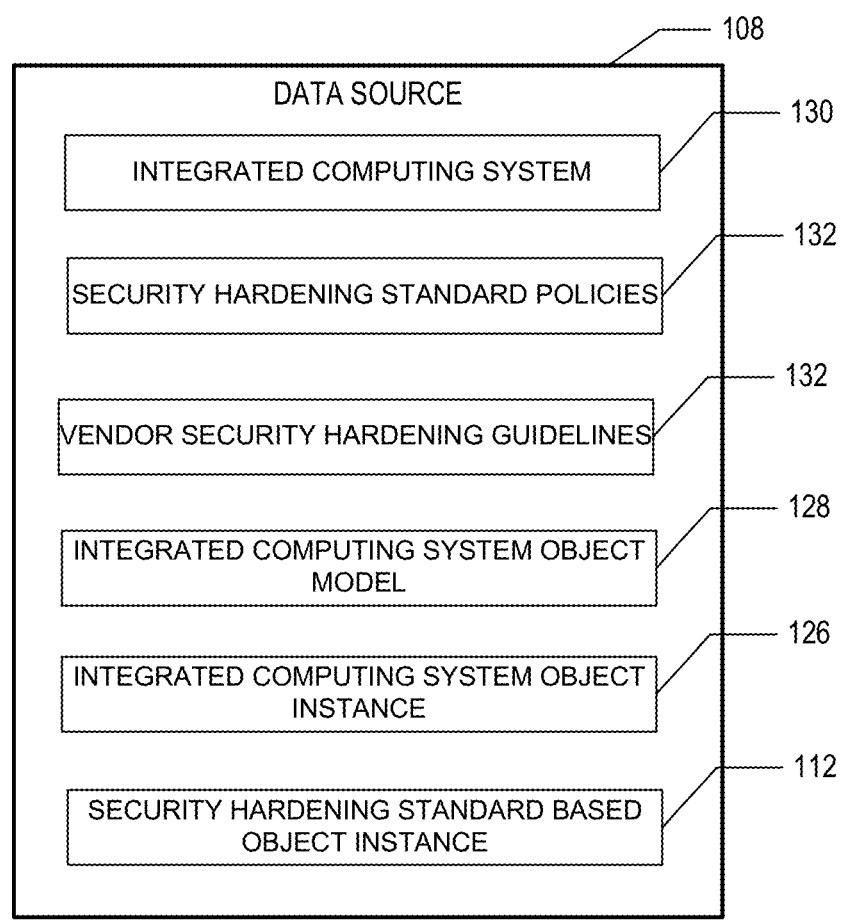

FIGS. 1A and 1B illustrate an example compliance management system 100 according to the teachings of the present disclosure. The compliance management system 100 addresses the problems discussed above with conventional systems among other benefits and solutions. The system 100 includes a compliance management computing device 102 having a compliance management tool 104, an integrated computing system management application 106, and a data source 108. As will be described in detail below, the compliance management tool 104 creates a security hardening standard-based object instance 112 that represents an integrated computing system 114 in which the security hardening standard-based object instance 112 includes one or more sub-object instances 116 corresponding to one or more hierarchally arranged sub-systems 118 of the integrated computing system 114. The tool 104 also modifies the security hardening standard-based object instance 112 to include security hardening policies 120 for the security hardening standard-based object instance 112 and its respective sub-object instances 116 so that the resulting security hardening standard-based object instance 112 may be used to determine whether one or more resources 122 in the integrated computing system 114 meet each security hardening policy 120 of a security hardening standard.

In general, the compliance management tool 104 identifies those resources 122 in the integrated computing system 114 that may be associated with each of multiple security hardening policies 120 of an established security hardening standard, and modifies an integrated computing system object instance 126 representing that integrated computing system 114 to form a security hardening-based object instance 112. The security hardening standard-based object instance 112 may then be used to determine whether the configuration of the resources 122 of the integrated computing system 114 adequately meets those security hardening policies 120.

The integrated computing system object instance 126 is a logical construct that represents the integrated computing system 114 in an object oriented form. That is, the integrated computing system object instance 126 uses object-oriented principles of abstraction, encapsulation, composition, inheritance, and/or polymorphism to define relationships between the resources 122 of the integrated computing system 114. The integrated computing system object instance 126 provides information about the relationships among the constituent resources 122 of the integrated computing system 114 to enable the tool 104 to adequately assess whether certain security objectives are met for the integrated computing system 114. That is, the object model from which the instance 126 is generated imparts contextual, relationship information about each resource 122 that may be used by the tool 104 to ensure that any applicable compliance rules for each of those resources 122 are adequately met. Additionally, when the integrated computing system 114 is deployed, the tool 104 may continually monitor the integrated computing system 114 for any changes that have occurred to its configuration, and generate another instance 126 to re-assess whether the modified integrated computing system 114 still meets those security rules given the modified configuration of the integrated computing system 114.

An integrated computing system typically includes integrated groups of components and "sub-systems" including sub-systems which are used to control security configuration settings. These security sub-systems should be programmed in order to ensure the desired security posture is achieved for the integrated computing system. According to one aspect of the present disclosure, a compliance management system includes a computer-based system to manage security configuration settings for an integrated computing system. Further, a compliance management system operating against an integrated computing system should be aware that it is acting upon an integrated computing system and not simply a group of unrelated components. In order to achieve this integration, the compliance management system requires integration with the specific object model for an integrated system and must be able to assess the security settings for each of the components and sub-systems within the integrated computing system to determine the appropriateness of each security setting within the context of the integrated system's design requirements. Additionally, the compliance management system should provide a consistent means for managing the available library of recommended security configuration settings in a logical system that can integrate with the various forms of integrated computing systems for which it will be assessing compliance. It is this library of recommended security settings which will subsequently produce the security hardening content and data that is required to create a well-formed security checklist for assessing the compliance status for an integrated computing system.

The integrated computing system object instance 126 may be obtained in any suitable manner. In one example, the integrated computing system object instance 126 may be obtained using a discovery process to obtain configuration information from the resources 122 of the integrated computing system 114 and the configuration information processed to create the integrated computing system object instance 126 that represents the configuration of the integrated computing system 114. In another example, the tool 104 may obtain the object instance 126 from another separate system that has generated the integrated computing system object instance 126 independently of the compliance management system 100. Additionally, the integrated computing system object instance 126 may be obtained from a specification of an integrated computing system that has not yet been fabricated. For example, the tool 104 may receive a specification that defines the configuration of an integrated computing system from a separate integrated computing system design tool, and generate the integrated computing system object instance 126 according to the received specification. Hence, the integrated computing system object instance 126 is effectively defined by the tool 104, while the various resources 122 (e.g., compute resources, storage resources, network resources, etc.) have not been physically integrated and assembled into a functioning integrated computing system.

Once the security hardening standard-based object instance 112 is created, it may be used to determine whether the configuration of each resource 122 meets the security hardening policies stored in security hardening standard-based object instance 112, and generate an alarm and/or produce a report to alert administrators that a non-compliant configuration for a particular resource or a group of resources 122 exist in the integrated computing system 114. Additionally, the compliance management tool 104 may generate a new security hardening standard-based object instance 112 or modify an existing security hardening standard-based object instance 112 whenever changes occur in the resources 122 to account for changes in the configuration of the integrated computing system 114. For example, the compliance management tool 104 may receive a message from the integrated computing system management application 106 when a new resource 122 is instantiated and update the security hardening standard-based object instance 112 with compliance policies associated with the newly created or modified resources 122 such that subsequent compliance verification checks may account for the newly created or modified resources 122.

The compliance of resources generally refers to verification of the configuration of those resources to ensure certain objectives (e.g., security objectives, performance objectives, etc.) are met. For example, one compliance policy may include verifying that only certain communication ports that are required for operation of the application are open while verifying that all other communication ports (e.g., telnet ports) are closed. Other example compliance policies may include verification of a quantity and/or performance level of any processors exist in a resource, an amount of memory allocated to the resource, what other resources that may communicate with the subject resource, load balancing rules, redundant memory locations, and the like.

The security hardening standard-based object instance 112 stores security hardening policies 120 used to verify compliance of each of the resources in the integrated computing system 114. The security hardening policies 120 may include compliance requirements based on any suitable standard, such as a security hardening standard (e.g., extensible configuration checklist description format (XCCDF), security content automation protocol (SOAP), open vulnerability and assessment language (OVAL), and the like). In one embodiment, the security hardening standard-based object instance 112 may be exported as an extensible markup language (XML) formatted file that may be used by a third party tool for ensuring compliance of each resource 122 in the integrated computing system 114 against a certain security hardening policies. For example, the tool 104 may export the security hardening standard-based object instance 112 as an XML formatted file to an integrated computing system management application 106 that verifies each resource 122 in the integrated computing system 114 against the security hardening policies 120 and outputs the results of the verification. One example of such an integrated computing system management application includes a VCE VISION™ software suite that is available from VCE Corporation, which is headquartered in Richardson, Tex.

In one embodiment, the integrated computing system management application 106 may include a compliance testing engine that receives the security hardening standard-based object instance 112, and verifies the configuration of the integrated computing system 114 against the compliance policies included in the security hardening standard-based object instance 112. One example of such a tool includes a compliance testing engine as described in U.S. Pat. No. 9,065,746, which is entitled "Compliance Testing Engine For Integrated Computing System," filed on Dec. 28, 2012, the contents of which are incorporated by reference in its entirety.

In one embodiment, the system 100 may also include a security hardening standard interpreter 107 that may be integrated with and consume information provided by the system 100. For example, the security hardening standard interpreter 107 may input information associated with a security hardening standard (e.g., OVAL, XCCDF, etc.), convert one or more policies included in the information into a standardized format, and communicate with the tool 104 to modify one or more sub-object instances 116 to include those policies in the standardized format. Additionally, the security hardening standard interpreter 107 may obtain a security hardening-standard based system object instance 112, parse the information according to the configuration of the instance 112, translate any included compliance policies into a form suitable for consumption by a particular security hardening standard, and output the translated compliance information based on the format of that security hardening standard.

As shown, the integrated computing system 114 includes multiple sub-systems 118 that may each have one or more resources 122. Nevertheless, the integrated computing system 114 may include any arrangement and number of resources 122 without departing from the spirit and scope of the present disclosure. The resources 122 of the integrated computing system 114 may refer to computing devices, such as hardware computing devices (e.g., hosts), virtual computing devices (e.g., virtual objects), or executable software, such as an operating system (OS) that perform some function for the overall operation of the integrated computing system 114. Examples of such computing devices may include, for example, laptop or notebook computers, workstations, tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The integrated computing system 114 may also include integrated computing systems, such as storage arrays, network resource, compute devices, and/or any combination thereof. For example, the integrated computing system 114 may include one or more converged infrastructures (CIs) configured in a cloud computing environment.

The integrated computing system 114 may include any arrangement and number of resources 122. For example, if the computing resources 122 comprise objects of an integrated computing system, such as a converged infrastructure, the resources of the integrated computing system may represent hardware resources, software resources, and/or one or more virtual objects executed on those hardware resources, which may be implemented in a virtual computing environment, either physical or one providing virtualized resources using techniques such as virtualization. The virtual computing environment may be embodied in any computing system that provides bare metal computing devices, where the applications and operating system are executed directly on the compute resources, or on virtualized resources (virtual objects) executed on one or more physical hosts. One particular example integrated computing system 114 that is embodied as a converged infrastructure is shown and described herein below with respect to FIGS. 2A and 2B.

The tool 104 generates the security hardening standard-based object instance 112 from an integrated computing system object instance 126 stored in the data source 108. The integrated computing system object instance 126 represents the integrated computing system 114 as a unified entity. The integrated computing system object instance 126 is created as a specific instance of an integrated computing system object model 128 and reflects the actual configuration information obtained from the integrated computing system 114. While the integrated computing system object model 128 is generic to a wide range of possible configurations and resource types found in integrated computing systems, the integrated computing system object instance 126 is specific to the actual configuration and resource types of a particular integrated computing system 114.

The integrated computing system object model 128 may be a class definition (e.g., a class, a set of sub-classes, methods, properties, etc.) implemented according to object-oriented principles, while the integrated computing system object instance 126 is a particular instantiation of the software class and its sub-classes, populated with configuration information obtained from each resource 122 in the integrated computing system 114. The integrated computing system object model 128 may be implemented as a database schema, such as a schema for a SQL database, such that the integrated computing system object instance 126 includes a particular collection of tables and relationships built in accordance with the schema and reflecting the configuration of the resources 122 in the integrated computing system 114. The database implementation may be useful in some instances because it provides the benefit of persistence. The database implementation allows the integrated computing system object instance 126 to be stored in non-volatile memory (e.g., the data source 108), which can be accessed for further processing at any desired time in the future.

In a particular example, the integrated computing system object instance 126 may be generated by instantiating a class for the system object and instantiating each of a first set of sub-object classes subordinate to the system object class. A resulting first set of sub-object instances 116 may each represent a different logical category of resources, such as 'storage,' 'compute,' and 'network,' sub-systems as would be found in a typical converged infrastructure. Any number of the first sub-object instances 116 can be provided. For example, a 'connectivity' sub-object instance 116 may be instantiated from the integrated computing system object model 128 to provide a category for cables and other connection resources. Additionally, a 'graphics' sub-object instance 116 can be instantiated from the integrated computing system object model 128 to provide a category for graphics processing units (GPUs) and other video streaming resources. It is emphasized that the categories represented by the first set of sub-object instances may be considered as logical constructs that form container structures for aggregating underlying physical resources of their respective container and, in some cases, may include logical resources or logical groups of physical resources (e.g., RAID groups, LUNs, clusters, etc.). In some examples, the categories themselves may include aggregate information about underlying resources, such as utilization, health, etc., which may not be obtained directly from the resources 122 of the integrated computing system 114.

Generating the integrated computing system object instance 126 may further include instantiating each of a second set of sub-object classes from the integrated computing system object model 128, to represent underlying physical resources 122 of the integrated computing system 114 in accordance with a second set of sub-object instances 116. For example, sub-classes of the integrated computing system object model 128 corresponding to particular physical resources (e.g., disk arrays, server blades, computing racks, etc.) may be instantiated to generate sub-object instances 116 that provide software models of the resources. In some examples, these sub-object instances 116 are similar to the software interfaces provided by the resource providers, but may include additional information and functionality. Also, unlike the software interfaces available from the providers, these second set of sub-object instances 116 fit within and are integrated with the overall integrated computing system object instance 126. It is understood that the second set of sub-object instances 116 refer to respective physical resources and can thus be regarded as software implementations of physical models, or 'physical' instances, which differ from the logical instances in the first set of sub-object instances.

In some examples, the software models in the second set of sub-object instances 116 may be generic models that represent respective physical resource types but are not particular to specific vendor makes or models. For example, a software model for a resource type (e.g., a server blade) is constructed generically, so as to be effective in representing a range of different vendor makes and models of resources of that type. Thus, the sub-object instance for a resource is generated from a generic object class but is customized with particular attribute values such that the resulting software model is specific to the particular resource.

The integrated computing system object instance 126 and some, most, or all sub-object instances 116 may be populated with one or more attributes based upon the configuration data obtained for its respective resource 122. According to embodiments of the present disclosure, the tool 104 may modify each sub-object instance 116 to include one or more security hardening policies 120 associated with a security hardening standard. The tool 104 may process the integrated computing system object instance 126 and each sub-object instance 116 and populate each with certain security hardening policies 120 according to their relevance to the security hardening policies 120 of the security hardening standard. For example, if the security hardening standard specifies a requirement that specifies a minimum amount of random access memory for a certain type of resource, the tool 104 may process the integrated computing system object instance 126 to determine which sub-object instances 116 are of that type, and populate those sub-object instances 116 with security hardening policies 120 as attributes that can later be used to verify compliance of its respective resource 122 against the security hardening policy 120.

The integrated computing system object instance 126 can include logical and physical sub-object instances at various (e.g., hierarchal) levels. For example, it may be possible for a sub-object instance representing a storage array (a physical entity), which resides under the 'storage' category (a logical entity) to be included in the object instance hierarchy of logical object instances, such as logical unit numbers (LUNs), virtual storage area networks (VSANs), and RAID groups. Further, any number of storage arrays, or portions thereof, can be grouped in one or more resource pools, which can be represented under the storage category of the integrated computing system object instance 126 as respective logical object instances. Also, it is possible for an object instance representing a compute rack (a physical entity), which resides under the 'compute' category (a logical entity) to include logical object instances such as virtual compute blades. Further, it is possible for an object instance representing a network rack (a physical entity), which resides under the 'network' category (a logical entity) to include logical object instances such as virtual network interface cards (VNICs) and virtual local area networks (VLANs).

The data source 108 stores integrated computing system information 130, security hardening policies 120, one or more vendor security hardening guidelines 132, at least one integrated computing system object model 1, at least one integrated computing system object instance 126, and at least one security hardening standard-based object instance 112. The integrated computing system information 130 stores raw configuration information about the integrated computing system 114, such as a number and type of each resource 122 implemented in the integrated computing system 114. The security hardening policies 120 store information about the security hardening policies of a particular security hardening standard (e.g., XCCDF, SOAP, OVAL, etc.). The integrated computing system object model 128 is generic to a wide range of possible configurations and resource types found in integrated computing systems, while integrated computing system object instance 126 is specific to the actual configuration and resource types of a particular integrated computing system 114. The security hardening standard-based object instance 112 generally includes an integrated computing system object instance 126 that has been modified by the compliance management tool 104 to include security hardening policies 120 associated with a particular security hardening standard.

The compliance management computing device 102 and the integrated computing system 114 communicate with one another in any suitable manner, including but not limited to, wired (e.g., copper), and/or optical communications networks. In one embodiment, the compliance management computing device 102 and the integrated computing system 114 communicates with one another using a communication network 136, such as an intranet, LAN, virtual LAN or VLAN, wide area network or WAN, or another wired and/or potentially wireless communication network as required for the proper function of the system. In another embodiment, the management computing system 102 and integrated computing system 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the compliance management computing device 102 and integrated computing system 114 may communicate with one another without the use of a separate and a distinct network. Additionally, other embodiments contemplate that the modules employed by the integrated computing system management application 106 are executed by a computing device configured on the integrated computing system 114.

Figure 2A:
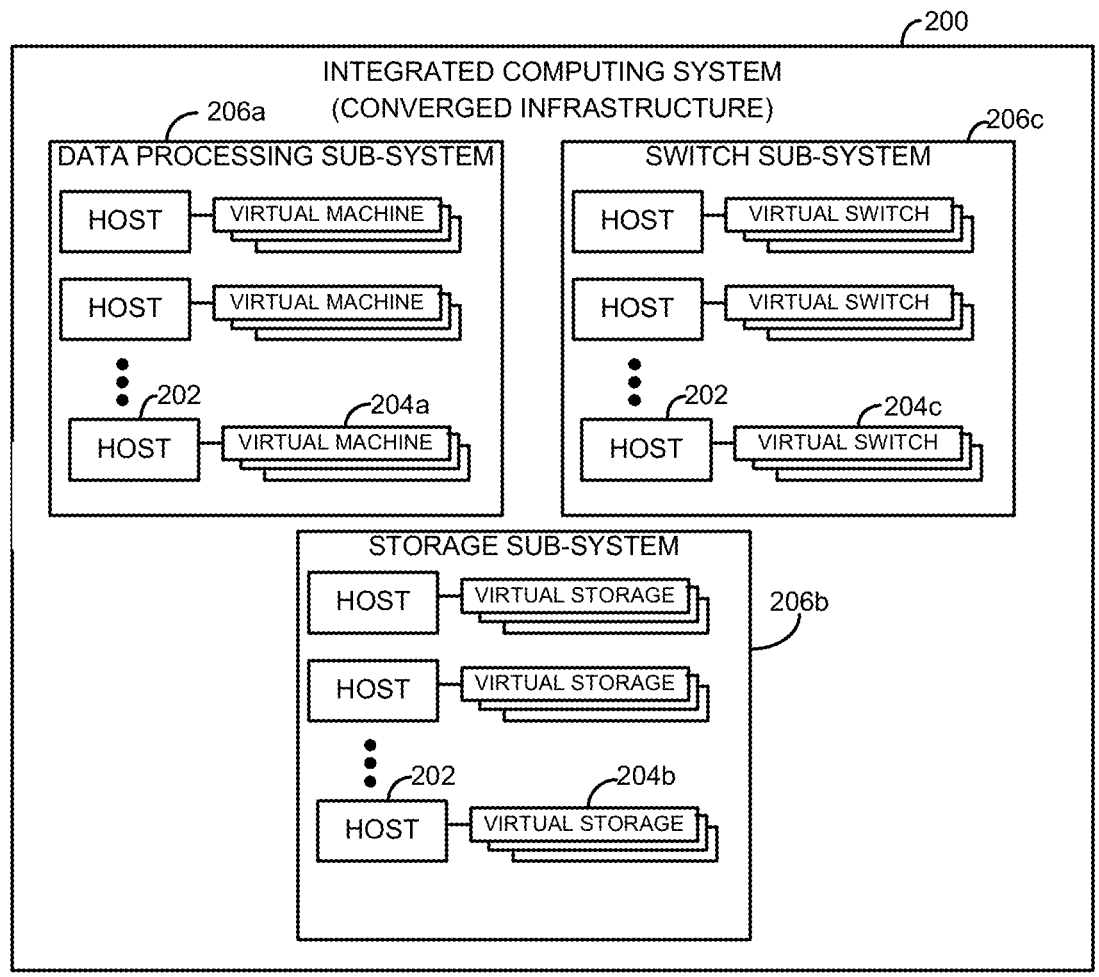
FIGS. 2A and 2B illustrate an example integrated computing system embodied as a converged infrastructure according to one embodiment of the present disclosure.

FIG. 2A illustrates an example converged infrastructure 200 that may provide multiple computing resources 122 to be monitored by the system 100 according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or resource that support the operation of virtual resources and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 200 such as that shown includes resources found in Vblock™ System infrastructure packages available from VCE, LLC, which is headquartered in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include resources, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Referring again now to FIG. 1, the integrated computing system management application 106 manages various activities of the computing environment 114 and may also manage operation of the hosts 202 and virtual objects 204 of the converged infrastructure 200. For example, the integrated computing system management application 106 manages the allocation and de-allocation of resources, such as hosts and virtual objects used by the system. Additionally, the integrated computing system management application 106 may manage the remediation of failures in the system by monitoring the health of each resource and performing corrective measures, such as migration (e.g., failover) to different resources in the event that certain resources have failed or are malfunctioning in some way.

Figure 2B:
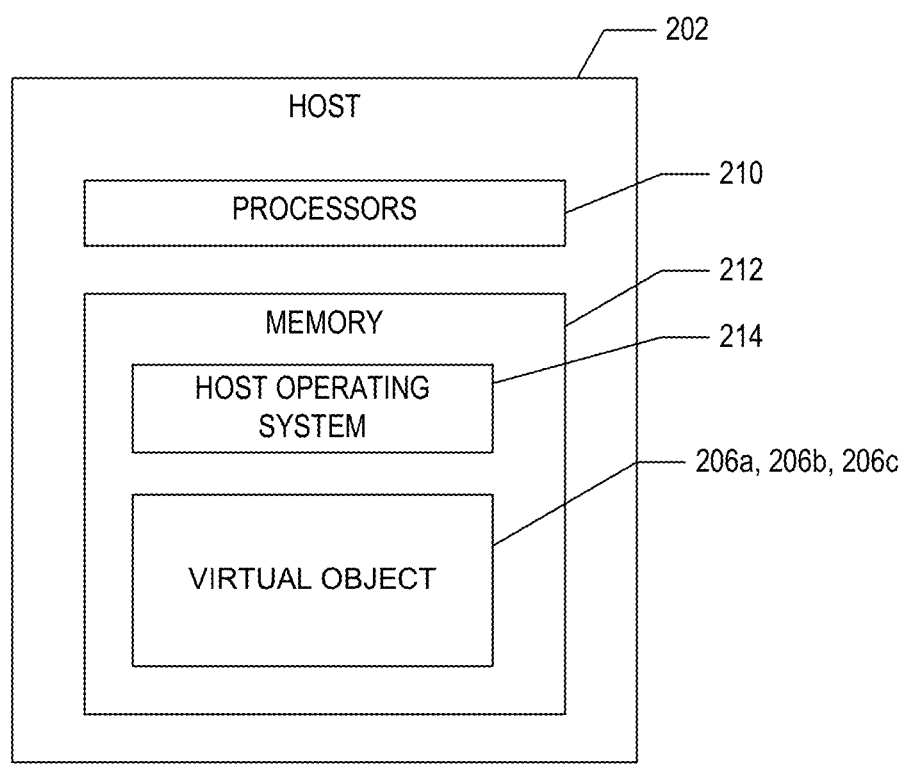

FIG. 2B illustrates an example host 202 implemented on each converged infrastructure 200 according to one aspect of the compliance management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources 122 of the integrated computing system 114. Each virtual object may be instantiated or deleted under control of the host operating system 214, which is in turn, controlled by the integrated computing system management application 106. That is, the host operating system 214 may be controlled by the integrated computing system management application 106 to instantiate new virtual objects are they are needed and destroyed to alleviate excess capacity in their associated hosts 202. Although the present embodiment discloses one particular type of computing structure that may be implemented as a multi-tier computing environment, it should be understood that any computing environment that may adjust, add, and/or delete resources according to the needs of applications executed on the computing environments may be viable alternatives.

Figure 3:
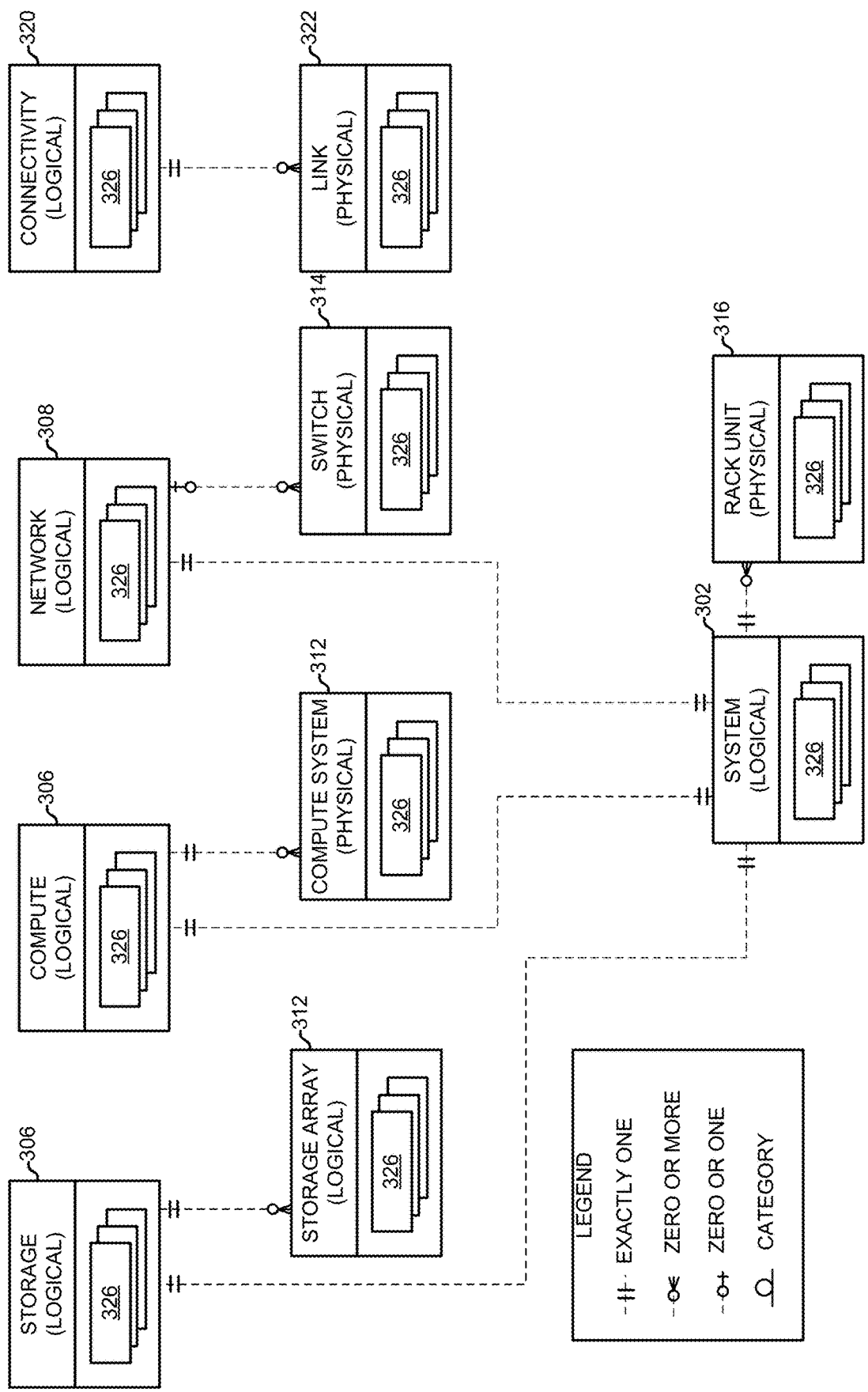
FIGS. 3 through 7 illustrate an example integrated computing system object model that may be used to create an integrated computing system object instance representing an integrated computing system according to one embodiment of the present disclosure.

FIGS. 3 through 7 illustrate an example integrated computing system object model 128 that may be used to create an integrated computing system object instance 112 representing an integrated computing system 114, such as the converged infrastructure 200 as shown and described above with respect to FIGS. 2A and 2B. FIG. 3 includes a legend indicating one of various meanings of different symbols used these figures. Various relationships are shown with dashed lines to indicate that the relationships can vary between different objects and that the relationships may be non-existent in certain configurations. Additionally, each object as shown in FIGS. 3 through 7 may include one or more attributes that may each be populated with information about its respective object, such as a unique identifier that uniquely associates its respective object to a resource 122 of the integrated computing system 114. According to embodiments of the present disclosure, the attributes 326 may also include information about one or more security hardening policies 120 that are associated with its respective sub-object instance 116 created from its object.

As shown in FIG. 3, a system object 302 represents an integrated computing system 114 that in this particular case is a Vblock™ system that is available from VCE Corporation, which is located in Richardson, Tex. The system object 302 (along with its sub-objects) may be instantiated to generate the integrated computing system object instance 126. A first set of sub-objects are shown in one-to-one relationships with the system object 302. These sub-objects may be provided as children of the system object 302 and include a storage object 304, a compute object 306, and a network object 308. The objects 304, 306, and 308 are logical objects, as they do not themselves directly represent any individual physical hardware resources but rather serve as aggregating objects, which include other objects that directly represent hardware. For example, the storage object 304 may include instances of a storage array object 310, which provides a software model for a physical storage array, such as an EMC Symmetrix or VNX storage array. As indicated by the E-R notation, the storage object 304 can reference zero or more storage array instances instantiated from the storage array object 310, that is, the object model may support any quantity of storage arrays. Similar relationships are shown for the compute object 306, which can include any number of instances of a physical compute system object 312, and for the network object 308, which can include any number of instances of a physical switch object 314.

In the example shown, the system object 302 can also include any number of rack unit objects 316. It is noted that rack unit objects do not necessarily belong to any particular class. Objects for certain resources, such as power supply units (PSUs) and sensors, may similarly be provided outside the scope of any class. In an alternative arrangement, another class object may be provided for racks, which includes any number of physical rack unit objects 316 as sub-objects.

In an example, the objects shown in FIG. 3 are part of a base model or super class (not shown), from which the objects of FIG. 3 inherit various common properties and/or methods. The use of a base class may avoid duplication of code and provides a construct for associating objects that do not have direct constrained relationships. For example, a connectivity object 320 is provided without any identified parent. Rather, the connectivity object 320 is a member of the base class and thus shares a common software structure with the other objects. In this particular example, the connectivity object 320 is configurable to have a number of different parent objects, such as the switch object 308, the compute object 306, or a number of other objects. In the example shown, the connectivity object 320 is a logical object, which can include any number of physical link objects 322. In general, link objects 322 refer to cables.

The objects shown in FIG. 3 can each have any number of methods and/or properties. The properties include attributes 326, whose values are assigned to instances when the integrated computing system object instance 126 is generated. Each object may have an attribute for a model identifier (MOID), which is assigned a unique value, such as a globally unique ID (GUID). Although few examples of object attributes are shown in FIG. 3, it is understood that objects typically have hundreds or more attributes. For generic objects representing hardware (e.g., racks, server blades, disks, etc.), the attributes serve to tailor the respective object instances instantiated from those objects to the particular characteristics of the makes or models of the underlying hardware that the object instances represent. The attributes 326 can specify health, performance, and relationships to other resources (e.g., parent objects, containment within racks, etc.). Attributes 326 can also store physical location information, such as GPS coordinates, building address where installed, and location within a data center. In some examples, attributes specify other characteristics generated by the tool 104 but not provided directly from the resource during discovery. In some examples, the attributes may store logical information, such as membership in RAID groups, LUNs, or computing clusters.

Figure 4:
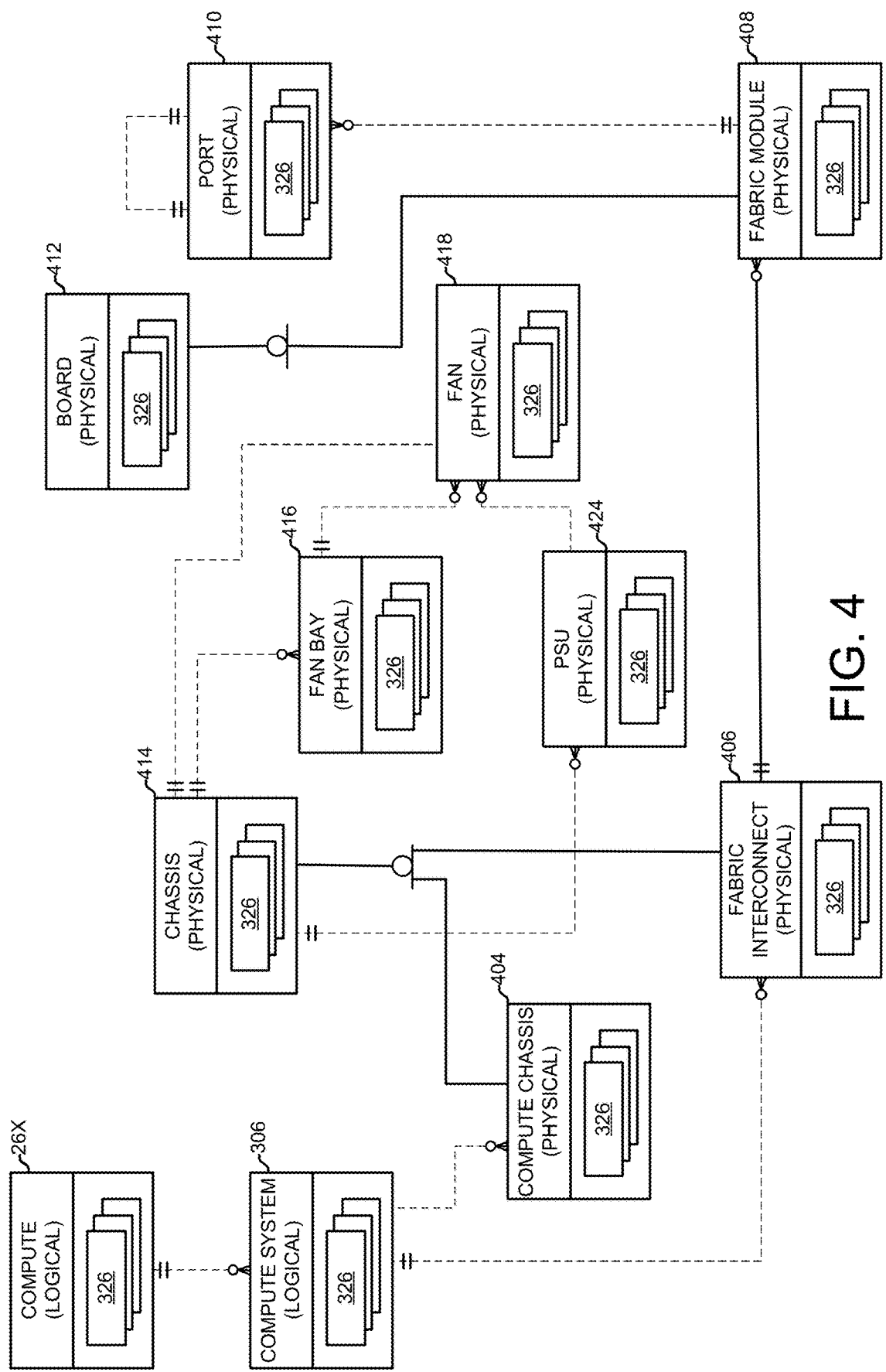

FIG. 4 shows an example arrangement of compute objects associated with a compute sub-system 118 that may form a portion of the resources 122 of the integrated computing system 114 of FIGS. 2A and 2B. The compute object 306 may include any number of compute system (physical) objects 312. Each compute system object 312 can include any number of compute chassis objects 404, and any number of fabric interconnect objects 406. Each fabric interconnect object 406 can include any number of fabric module objects 408, which can include any number of port objects 410. The fabric module objects 408 are a category of board objects 412. Also, the compute chassis objects 404 and fabric interconnect objects 406 are categories of a chassis object 414. The chassis object 414 can include any number of fan bay objects 416 and any number of fan objects 418. Also, the fan bay object 416 can include any number of fan objects 418. The chassis object 404 also includes any number of PSU (power supply unit) objects 424, which in turn may include any number of fan objects 418.

The arrangement of objects in FIG. 4 displays the flexibility of the integrated computing system object model 128 in representing a variety of system configurations. For example, the variable arrangement of fan bay objects 416 and fan objects 418 reflects the fact that some chassis include individual fans whereas others include fan bays having multiple fans. The arrangement of FIG. 4 also shows that some of the objects of the object model 128 are reusable in different contexts. For example, the same fan object 418 may be used to represent a fan in a fan bay of a chassis, a fan of a chassis without reference to any fan bay, and the fan of a power supply unit. In any particular integrated computing system object instance, these objects can be instantiated in a manner consistent with the particular configuration, with the object instances forming building blocks that can be used as needed in different contexts.

Figure 5:
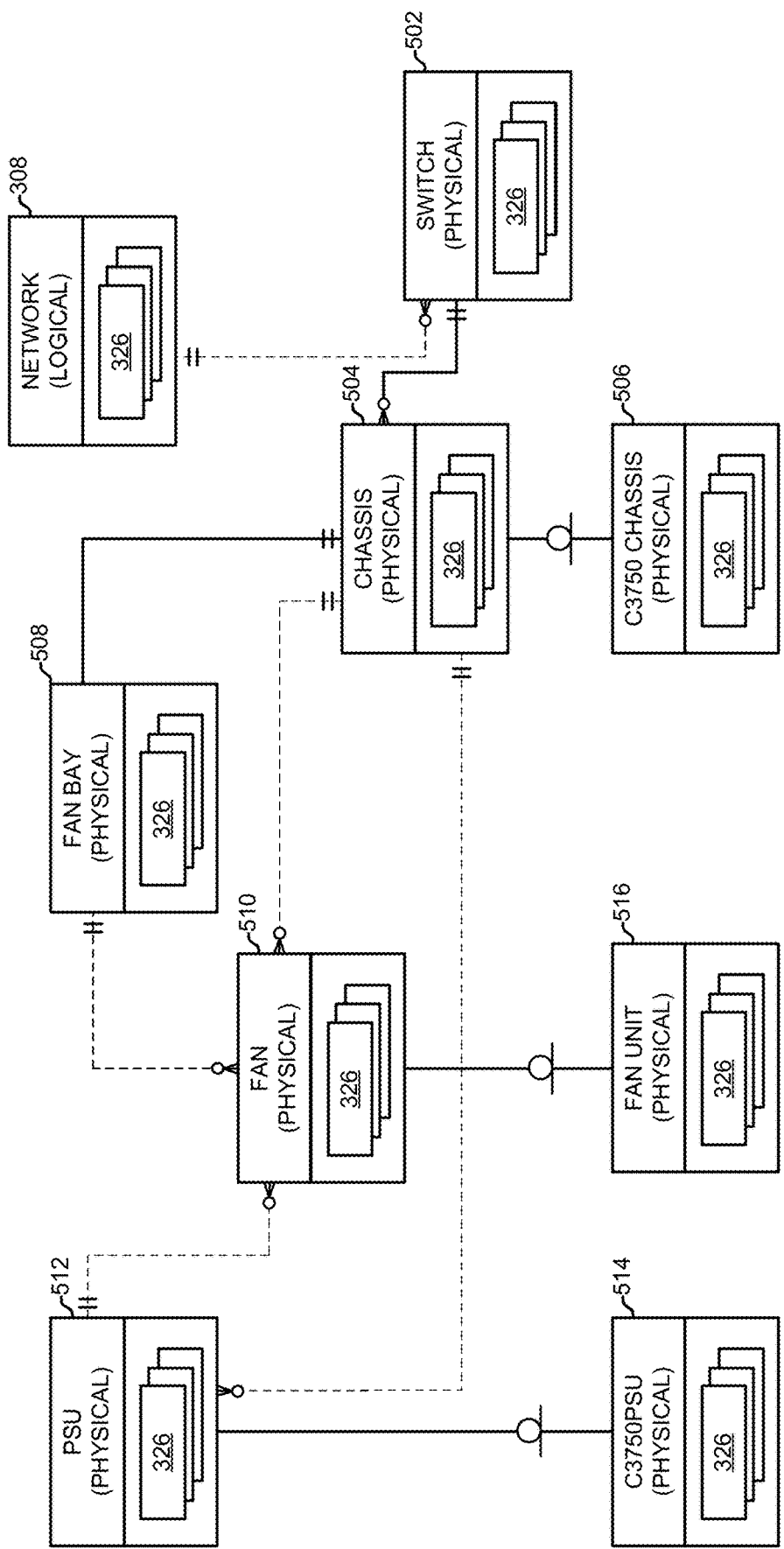

FIG. 5 shows an example arrangement of network objects of the network sub-system 308 that may form a portion of the resources 122 of the integrated computing system 114 of FIGS. 2A and 2B. The network object 308 may include any number of switch objects 502. The switch object 502 includes any number of chassis objects 504. One particular category of the chassis object 504 is a C3750 chassis object 506. The chassis object 506 includes any number of fan bay objects 508 as well as any number of fan objects 510. In some arrangements, each fan bay object 508 includes any number of fan objects 510. Also, the chassis object 504 can include any number of PSU objects 512, each of which in turn can include any number of fan objects 510. One category of the PSU object 512 may include a C3750 PSU object 514, which is a particular type of PSU. A category of the fan object 510 may also include a C3750 fan unit object 516. It is seen from FIG. 5 that the certain objects that form building blocks for one classification can also be used as building blocks in another classification. Such objects forming building blocks are thus not constrained to any classification and can be used throughout the object model.

Figure 6:
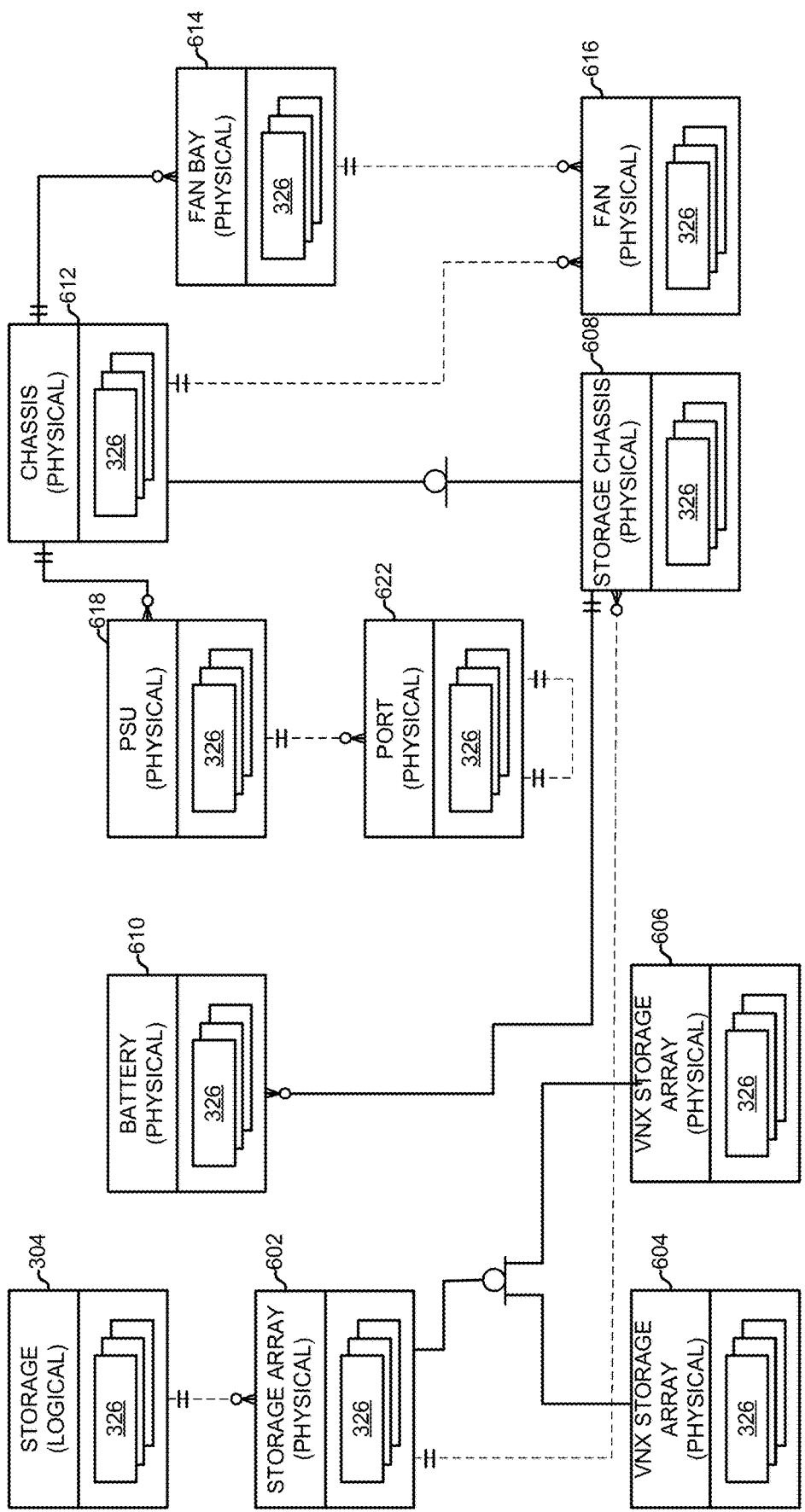

FIG. 6 shows an example arrangement of several storage objects of a storage sub-system 304 that may form a portion of the storage resources 122 of the integrated computing system 114 of FIGS. 2A and 2B. Here, the storage object 304 may include any quantity of storage array objects 602.

Categories of the storage array object 602 may include a VNX storage array object 604 and a VNX storage array object 606. Each storage array object 602 can include any number of storage chassis objects 608, each of which can include any number of battery objects 610. The chassis object 612 is shown as a category of the storage chassis object 608. The chassis object 612 can include any number of fan bay objects 614 and any number of fan objects 616. Each fan bay object 614 can include any number of fan objects 616. The chassis object 612 can include any number of PSU objects 618. The PSU object 616 can include any number of port objects 622, thus reflecting the fact that power supply units of storage chassis can include multiple ports. The arrangement of FIG. 6 further underscores the reusable nature of objects as building blocks, even in different system contexts, where customization of the generic building blocks is achieved by arranging object instances and populating their attributes based on discovery.

Figure 7:
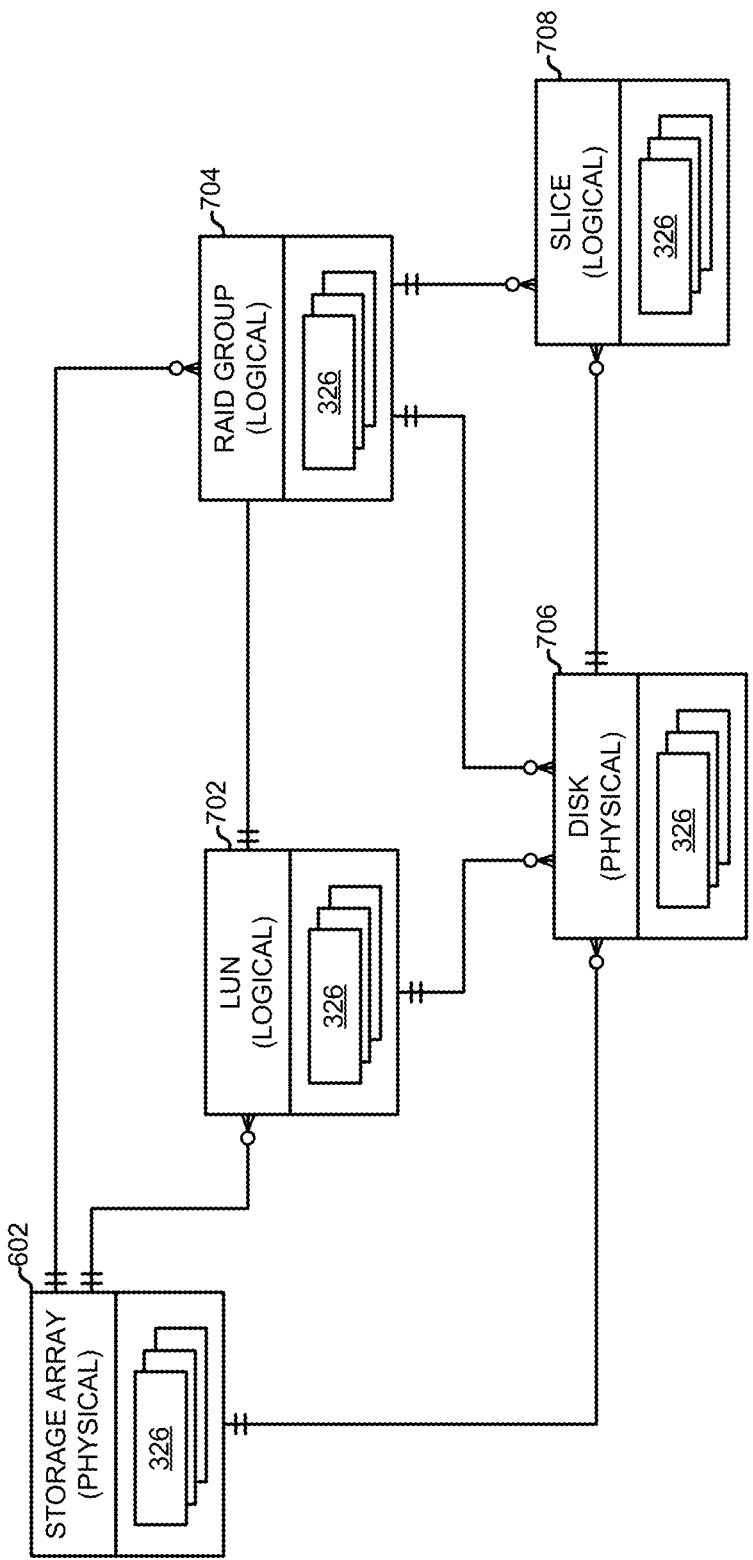

FIG. 7 shows an example storage diagram of physical and logical storage objects that may form a portion of the resources 122 of integrated computing system 114 of FIGS. 2A and 2B. Here, the storage array object 602 can reference any number of LUN objects 702, which in turn can each reference any number of RAID group objects 704. Also, the storage array object 602 can directly reference any number of disk objects 706 and any number of RAID Group objects 704. Each disk object 706 can reference any number of slice objects 708. Also, each LUN object 702 and each RAID Group object 704 can reference any number of slice objects 708. The storage diagram thus shows how physical and logical objects can be used together as building blocks in the integrated computing system object model 128. Similar arrangements can be made for other objects, such as compute objects (e.g., logical compute blades) and network objects (e.g., VNICs, VLANs, etc.).

Using the integrated computing system object model 122, as shown by way of example in FIGS. 3-7, a particular integrated computing system object instance 126 can be generated and populated with actual discovered configuration information obtained from the resources of the electronic system 140. Owing to the generic nature of the integrated computing system object model 122, different integrated computing system object instances 126 can be generated to reflect different configurations of the electronic system 140, and indeed to reflect different electronic systems. In some arrangements, a single computerized apparatus 110 can connect, e.g., over the network 130, with multiple electronic systems (e.g., multiple Vblock™ systems), where each electronic system is represented with a respective integrated computing system object instance. Each such integrated computing system object instance may have a different object identifier or OID and a different name attribute. In some examples, higher level objects are provided, such as a DataCenter object, which includes multiple system objects.

FIG. 8 illustrates an example security hardening policy display/edit screen 800 that may be used to display the security hardening policies 120 of a certain security hardening standard and/or to edit those security hardening policies 120 by a user of the system 100. In general, the screen 800 includes a display output of a spreadsheet program in which security hardening policies 120 may be imported, manipulated, and exported in a format (e.g., XML) suitable for use by the tool 104. For example, the security hardening policies 120 for a particular standard may be entered on the spreadsheet program by a user via a suitable user interface and saved as a single file that may be accessed by the tool 100 for generating the security hardening standard-based object instance 114. As another example, the security hardening policies 120 may be imported from an external source and parsed according to an established structure for the spreadsheet. It should be appreciated that the use of a spreadsheet program is optional as a means and method to view one or more tables, views, queries, data or logical objects which may be managed in a relational or non-relational database or other persistent data store, and that other methods, including those performed by a computing system or by a logical operation encoded in a software program or by those action performed by a security professional or systems administrator in the course of defining security hardening policies or configuration requirements for an integrated system, may be utilized in a variety of ways toward the goal of managing the security hardening system object model instance for a particular integrated computing system, and these additional operations may be performed without deviating from the spirit and scope of the present disclosure.

The screen 800 generally includes rows for individual security hardening policies 120, while parameters associated with each security hardening policy 120 is arranged in columns 804 of the screen 800. For example, a unique name column 804a may include a unique name for its associated security hardening policy 120 that is globally unique from among all other names to be included in column 804a, yet provides sufficient information to enable its identification from among other security hardening policies 120 on the screen 800. A structured name column 804b may include a hierarchally structured name for the security hardening policy 120. A long form description column 804c may include a long form description that provides additional information about the nature of the security hardening policy, and is usually longer in form than the name provided in column 804a to include information sufficient to enable human understanding of what compliance measure is being verified by the security hardening policy 120.

A vulnerability risk column 804d includes a long form description of a vulnerability risk that may be reduced or eliminated by compliance of the integrated computing system 114 to the security hardening policy 120. A third party compliance measure column 804e includes third party compliance measures that may also be related to the security hardening policy 120. For example, the third party compliance measure may include enhanced level of restrictions placed upon one or more resources 122 of the integrated computing system 114 by another entity other than the entity that authored the standard (e.g., XCCDF, SOAP, OVAL, etc.), such as a provider of the integrated computing system 114 that may be above the restrictions placed on those resources 122 by the security hardening standard. An affected resource column 804f includes information associated with one or more resources 122 in the integrated computing system 114 that is affected by the security hardening policy 120. That is, column 804f includes information associated with those resources 122 that the security hardening policy 120 may be applied to ensure compliance of the integrated computing system 114 with the standard.

Although a unique name column 804a, structured name column 804b, a long form description column 804c, a vulnerability risk column 804d, a third party compliance measure column 804e, and an affected resource column 804f are shown, it should be appreciated that additional, fewer, or different columns may be provided without deviating from the spirit and scope of the present disclosure. For example, the table may include one or more additional columns that specify a particular vendor and/or product provided by the vendor of a resource 122 that may be affected by the security hardening policy 120. As another example, the table may include an additional column specifying a particular sub-system (e.g., compute, networking, storage) that may be affected by the security hardening policy 120.

According to one embodiment, the structured identifiers may have a hierarchal structure based upon one or more criteria, such as their origin, purpose, function, and resource applicability. The structured identifier includes a root name that identifies its originating entity (e.g., the entity that established the security hardening policy), and one or more suffix names identifying certain compartmentalized aspects of the originating entity. Additionally, a coded suffix may be appended to the root name that is increasingly detailed so that the resulting structured identifier is globally unique from all other structured identifiers.

For example, a certain security hardening policy that specifies disabling the shrinking of a virtual hard disk on a virtual machine by non-administrator users may be labeled with a root name of 'VCE' to indicate that the VCE Corporation is the entity that established the security hardening policy 120, and the root name appended with a suffix name of 'SEC' to indicate a particular type of product that the security hardening policy 120 is to address. The coded suffix the security hardening policy may include a numeral value in which each numeral position or a group of positions indicate additional detailed characteristics of the security hardening policy 120. For example, the coded suffix may be of the form 'XXXXXX.X' in which the first two number position indicates a sub-system (e.g., virtualization sub-system, compute sub-system, networking sub-system, storage sub-system, etc.) that the security hardening policy 120 is to be applied to, the third number position indicates a manufacturer of the sub-system, the fourth number position indicates additional details about the security hardening policy 120 such that the structured identifier is globally unique from all other global identifiers.

Thus, given the example described above, the security hardening policy 120 associated with the disabling the shrinking of a virtual hard disk on a virtual machine by non-administrator users may have a form, such as 'VCE-SEC101003.1', which is globally unique from among all other structured identifiers.

Certain embodiments of structured identifiers may provide several advantages not heretofore recognized in currently implemented nomenclatures. For example, the hierarchal structure may provide for extensibility in that the addition of future to be implemented security hardening policies 120 may be incorporated without deviating from the established taxonomy for the naming structure. Additionally, the hierarchal structure may provide for enhanced organization such that those security hardening policies 120 having a similar purpose and/or function may be grouped in a manner that provides for easy sorting or filtering according to one or more criteria.

Figure 9:
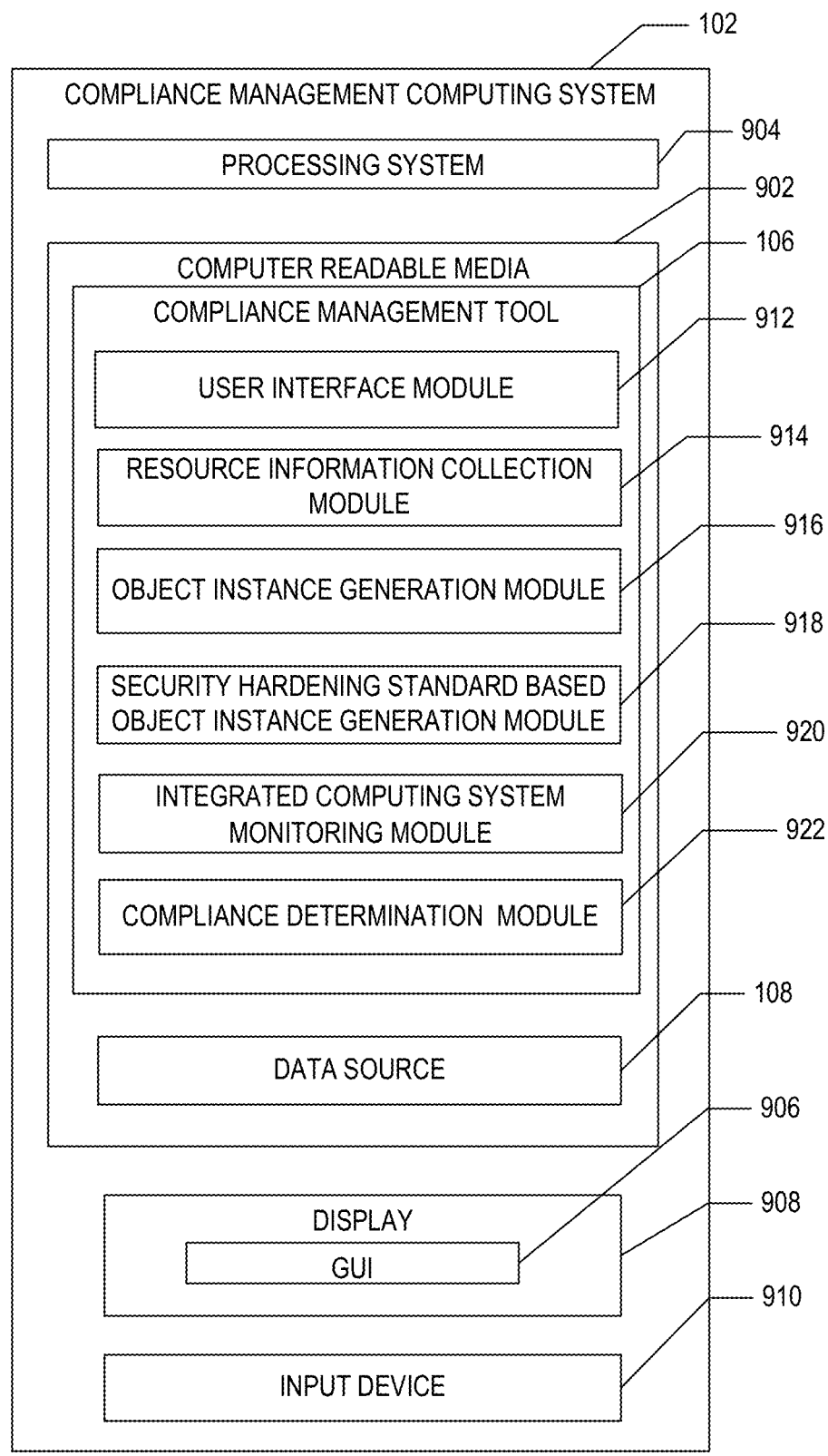
FIG. 9 is a block diagram depicting an example compliance management tool executed on the compliance management computing device according to one embodiment of the present disclosure.

Referring now in more detail to FIG. 9, a block diagram of an example compliance management tool 104 executed on the management computing system 102 is depicted according to one aspect of the present disclosure. The compliance management tool 104 is stored in a computer readable media 902 (e.g., memory) and is executed on a processing system 904 of the management computing system 102.

For example, the compliance management tool 104 may include instructions that may be executed in an operating system environment, such as a Microsoft Windows™ operating system, a Linux operating system, or a UNIX operating system environment. As another example, the compliance management tool 104 may be a Java™ or HTML5 based application that is executed within a web browser, such as a Firefox™ web browser.

The computer readable medium 902 includes volatile media, nonvolatile media, removable media, non-removable media, and/or another available medium. By way of example and not limitation, non-transitory computer readable medium 902 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the compliance management computing device 102 also includes a graphical user interface (GUI) 906 displayed on the display 908, such as a computer monitor, for displaying data. The compliance management computing device 102 also includes an input device 910, such as a keyboard or a pointing device (e.g., a mouse, trackball, pen, or touch screen) to enter data into or interact with the GUI 906. According to one aspect, the compliance management tool 104 includes instructions or modules that are executable by the processing system 902 as will be described in detail herein below.

A user interface module 912 facilitates the receipt of input data and/or output data from or to a user, respectively. In one example, the user interface 906 may also receive user input for manipulating or otherwise modifying the operation of the compliance management tool 104. As another example, the user interface 906 may receive user input for modifying and/or reviewing the security hardening policies 120 that are to be used by the tool 104.

A resource information collection module 914 collects information about the resources 122 in the integrated computing system 114. For example, the resource information collection module 316 may communicate with the operations management application 106 to obtain information about the resources as well as any performance information and/or characteristic information associated with each resource 122. The resources 122 may include those associated with an already deployed integrated computing system 114, or the resources 122 may include those associated with a specification to an integrated computing system 114 that has not yet been deployed. For cases in which the integrated computing system 114 has not yet been fabricated (e.g., deployed), the integrated computing system 114 may be represented by an object instance 126, such as one that has been created by a system architect based upon one or more requirements as specified by a customer. For cases in which the integrated computing system 114 has already been fabricated, the resource information collection module 914 may perform a discovery process to obtain information about the resources from an existing integrated computing system 114. The resources 122 of a fabricated integrated computing system 114 can potentially include a myriad of diverse configuration settings. Typically, the configuration information for a resource 122 includes some or all of the information that the resource's software interface normally supplies, as may be provided by its respective manufacturer. In some examples, the configuration information may include certain details about the resource, such as its physical location relative to other resources, its parent resource (e.g., a rack in which it is installed), and any logical groups to which it belongs, e.g., a RAID Group, a LUN (logical storage units), computing clusters, etc. In some examples, the details may also include computed summary information or metrics that describe the resource, which may be obtained from multiple separate pieces of information obtained from the resources and/or related resources, which describe, for example, the utilization of the resource, resource health (e.g., whether the resource appears to be functioning properly), and/or other information. In further examples, the configuration information may include user-specified metadata previously stored on or in connection with particular resources.

The resource information collection module 914 may collect information about both individual resources and information about relationships among the resources. For example, the resource information collection module 916 identifies not only the characteristics of a computing rack that houses the integrated computing system 114, but also information associated with the fact that the rack is positioned within a particular network. As another example, the resource information collection module 914 discovers not only the particular characteristics of a compute blade, but also the fact that it is located within the computing rack along with other compute blades and equipment. Once collected, the resource information may be stored as records 130 in the data source 108.

An object instance generation module 916 generates an object instance 126 that represents the integrated computing system 114 from an object model 128. The object instance 126 generally reflects the actual configuration information discovered from the integrated computing system 114. While the object model 128 may be generic to a wide range of possible configurations and resource types found in integrated computing systems 114, the object instance 126 is specific to the actual configuration of the resources 122 of the integrated computing system 114. For example, the object instance generation module 918 may instantiate a class for the base object (e.g., root level object) and instantiating each of a first set of sub-object classes subordinate to the base object class in which a resulting first set of sub-object instances may each represent a different logical category (e.g., storage, compute, and network, etc.). The object instance generation module 918 may also access a second set of sub-object classes from the object model 128 to represent underlying physical resources of the integrated computing system 114 with a second set of sub-object instances. For example, sub-classes of the object model 128 corresponding to particular physical resources (e.g., disk arrays, server blades, racks, etc.) may be instantiated to generate object instances that are representative of their resource counterparts.

A security hardening object instance generation module 918 modifies an object instance 126 representing an integrated computing system 114 to include information about security hardening policies 120 for each of the resources 122 configured in the object instance 126. For example, the security hardening object instance generation module 918 may include a security hardening policy 120 that specifies a particular electrical power redundancy arrangement to be maintained as an attribute of the base object of the object instance 126. The security hardening object instance generation module 918 may also include a security hardening policy 120 that specifies a minimum memory capacity level be maintained for certain type of compute VMs in each sub-object instance 116 representing compute VMs in the integrated computing system 114. The security hardening object instance generation module 918 may modify all sub-object instances 116 in the object instance 126 such that the resulting security hardened object instance 126 is completely defined by the security hardened standard.

A integrated computing system monitoring module 920 continually monitors operation of the integrated computing system 114 to detect changes in the configuration of any resources that execute the application. In one embodiment, the integrated computing system monitoring module 918 may use a detection event in which a resource associated with the integrated computing system has changed to initiate generation of a new security hardening standard-based object instance 112. In another embodiment, the integrated computing system monitoring module 918 may generate a new security hardening standard-based object instance 112 at ongoing, recurring (e.g., periodic) intervals, or when demanded by an operator.

The integrated computing system monitoring module 920 may detect changes in the configuration of the resources associated with the integrated computing system 114 in any suitable manner. In one embodiment, the integrated computing system monitoring module 920 may communicate with the integrated computing system management application 108 to receive a message each time the integrated computing system management application 106 detects a change to at least one resource of the integrated computing system 114.

A compliance determination module 922 checks for compliance of each resource 122 in the integrated computing system 114. In one embodiment, the compliance determination module 922 transmits the security hardening standard-based object instance 112 to a compliance management tool 104 that verifies compliance of each resource, and receives a report indicating which policies for each resource that is non-compliant. In one embodiment, the compliance determination module 922 may generate an alarm that includes information associated with the one unmet augmented compliance configuration. The alarm may be any type, such as an audible or visual indication, and/or a message (e.g., e-mail message) that includes the non-compliant information.

It should be appreciated that the modules described herein are provided only as examples, and that the tool 104 may have different modules, additional modules, or fewer modules than those described herein. For example, one or more modules as described in FIG. 9 may be combined into a single module. As another example, certain modules described herein may be encoded on, and executed on other computing systems, such as on one of the resources 122 of the integrated computing system 114.

Figure 10:
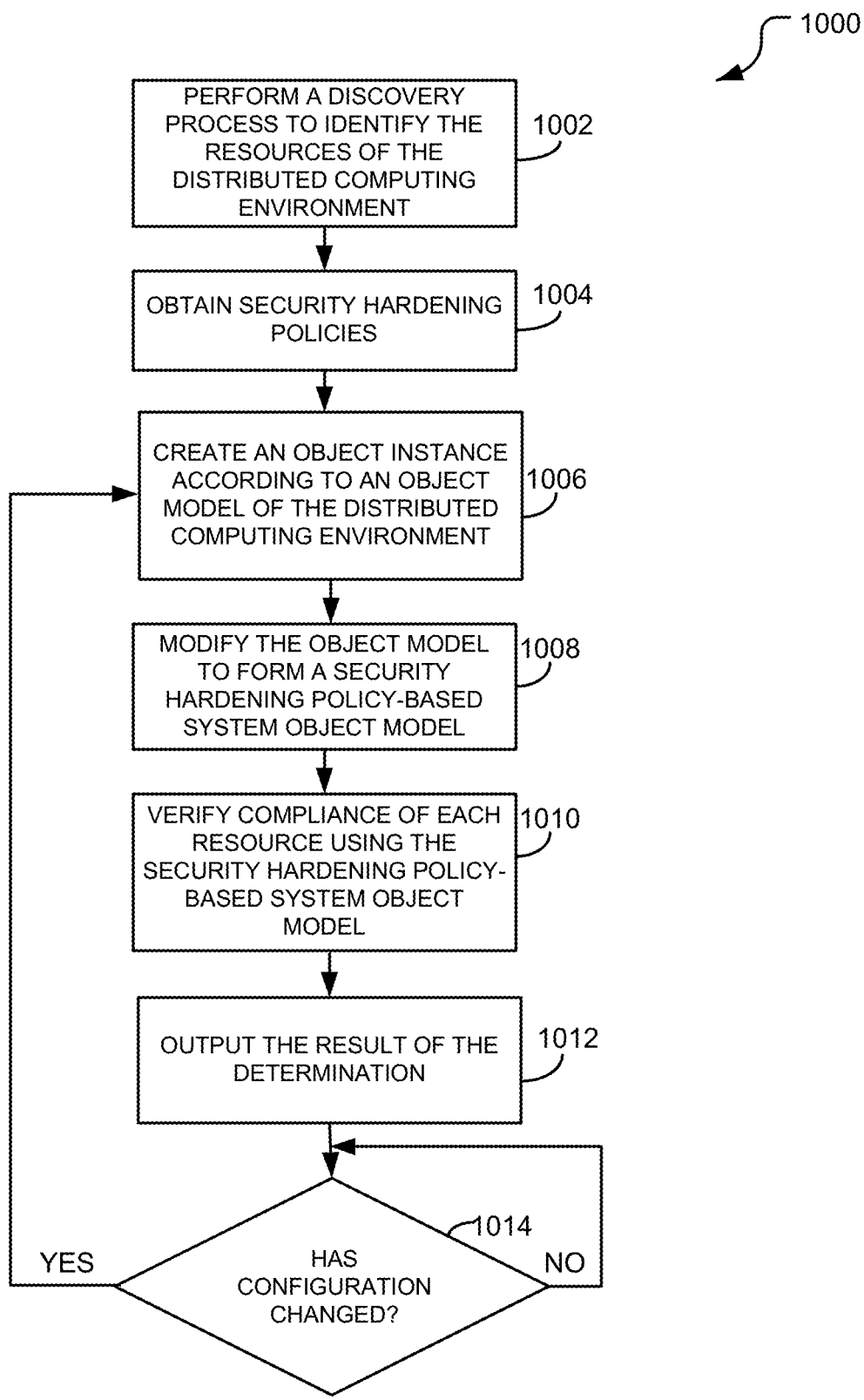
FIG. 10 illustrates an example process that is performed by the compliance management tool according to one embodiment of the present disclosure.

FIG. 10 illustrates an example process 1000 that is performed by the compliance management tool 104 to generate a security hardening standard-based object instance 112, which can then be used to determine whether the resources 122 of an integrated computing system 114 are in compliance with one or more security hardening policies 120 of a security hardening standard according to one embodiment of the present disclosure.

At step 1002, the tool 104 performs a discovery process to obtain configuration information for each of the resources 122 in the integrated computing system 114. In some cases, the tool 104 may obtain the configuration from an external source, such as the integrated computing system management application 106 described herein above.

At step 1004, the tool 104 obtains security hardening policies 120 associated with a security hardening standard. In one embodiment, the security hardening policies 120 may include vendor security hardening guidelines obtained from a provider of certain resources 122. For example, a provider of a blade array implemented in the integrated computing system 114, which may have intimate knowledge of how the blade array functions, may publish certain security hardening policy guidelines 132 that are recommended for use with the blade array to ensure secure compliant operation of the blade array. As such, the tool 104 may implement these security hardening guidelines 132 as security hardening policies 120 that may be used to verify proper compliance of the blade array within the integrated computing system 114.

At step 1006, the tool 104 creates an integrated computing system object instance according to an object model 128 associated with the integrated computing system 114, and modifies the object instance to form a security hardening standard-based object instance 112 at step 1008. Thereafter, the tool 104 may use the security hardening standard-based object instance 112 to verify compliance of the resources 122 in the integrated computing system 114 against the security hardening policies 120 in the security hardening standard-based object instance 112 at step 1010, and output the results of the determination at step 1012.

At step 1014, the tool 104 may continually monitor the integrated computing system 114 to determine whether its configuration has changed. For example, the tool 104 may communicate with the integrated computing system management application 106 to obtain operational information about the integrated computing system 114 to determine whether the configuration of one resource 122 or a group of resources 122 have changed. If not, processing continues at step 1014 to continually monitor the status of the integrated computing system 114; otherwise, processing continues at step 1006 to create a new integrated computing system object instance 126 that accurately reflects the configuration of the resources 122 in the integrated computing system 114, and uses this newly created object instance 126 to generate a new security hardening standard-based object instance 112 from which compliance of the modified integrated computing system 114 can be determined.

The previous steps may be repeatedly performed for the same or other integrated computing systems 114 to monitor their compliance against the same or different security hardening standards. Nevertheless, when use of the tool 104 is no longer needed or desired, the process ends.

Although FIG. 10 describes an examples of process that may be performed by the compliance management tool 104 for verifying compliance of an integrated computing system, the features of the disclosed process may be embodied in other specific forms without deviating from the spirit and scope of the present disclosure. For example, the compliance management tool 104 may perform additional, fewer, or different operations than those operations as described in the present example. As another example, the steps of the process described herein may be performed by a system other than the compliance management computing device 102, which may be, for example, one of the resources implemented in the integrated computing system 114.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 11:
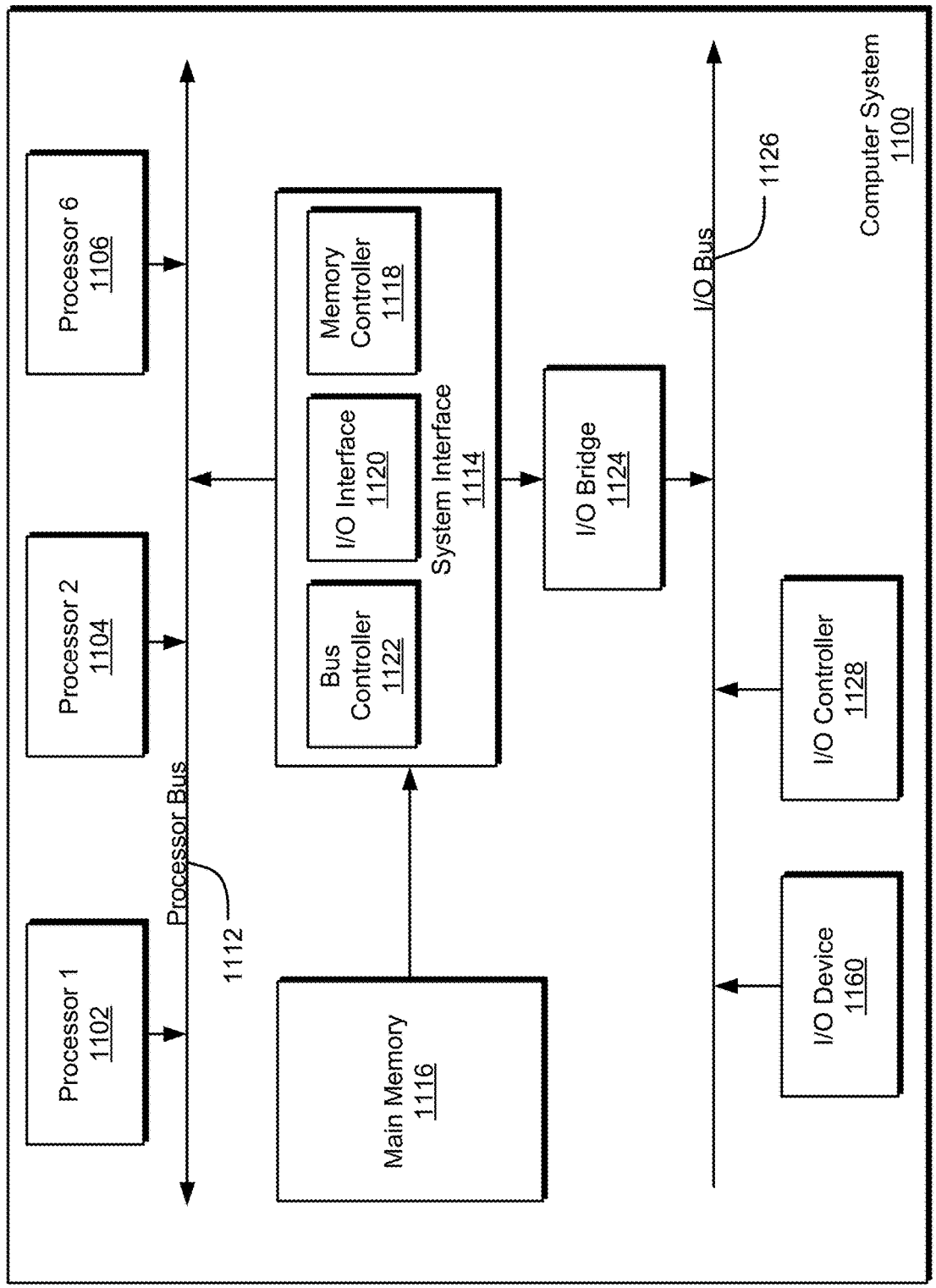
FIG. 11 is a block diagram illustrating an example of a computing device or computer system which may be used in implementing the embodiments of the present disclosure.

For example, FIG. 11 is a block diagram illustrating an example of a host or computer system 1100 which may be used in implementing the embodiments of the present disclosure. The computer system (system) includes one or more processors 1102-1106. Processors 1102-1106 may include one or more internal levels of cache (not shown) and a bus controller or bus interface unit to direct interaction with the processor bus 1112. Processor bus 1112, also known as the host bus or the front side bus, may be used to couple the processors 1102-1106 with the system interface 1114. System interface 1114 may be connected to the processor bus 1112 to interface other resources of the system 1100 with the processor bus 1112. For example, system interface 1114 may include a memory controller 1113 for interfacing a main memory 1116 with the processor bus 1112. The main memory 1116 typically includes one or more memory cards and a control circuit (not shown). System interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O device 1130, as illustrated.

I/O device 1130 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

System 1100 may include a dynamic storage device, referred to as main memory 1116, or a random access memory (RAM) or other computer-readable devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one embodiment, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software resources.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware resources or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the resources without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:
1. A computing system comprising:
   at least one memory to store instructions that are executed by at least one processor to:
   obtain a computing system object instance of a computing system, the computing system object instance comprising one or more sub-object instances corresponding to a resource of the computing system;

obtain security hardening policies associated with a security hardening standard, wherein one or more of the security hardening policies are each associated with a structured name having a hierarchal structure based upon one or more criteria associated with a type of the resource;

modify one or more of the sub-object instances to include the security hardening policies that are associated with the one or more sub-object instances to form a security hardening-based object instance; and determine, for each security hardening policy, whether a configuration of the resources represented by the one or more instances meets the security hardening policy using the security hardening-based object instance.

2. The computing system of claim 1, wherein the instructions are further executed to import the security hardening policies from at least one of a database, a persistent data store, and a spreadsheet program.

3. The computing system of claim 2, wherein the instructions are further executed to import the security hardening policies as an extensible markup language (XML) formatted file.

4. The computing system of claim 1, wherein the instructions are further executed to perform a discovery operation to obtain configuration information about the resources in the computing system, and create the computing system object instance using the obtained configuration information.

5. The computing system of claim 1, wherein the instructions are further executed to obtain configuration information from a computing system management application.

6. The computing system claim 1, wherein the instructions are further executed to obtain the computing system object instance from a computing system design tool, wherein the computing system has not yet been fabricated.

7. The computing system of claim 1, wherein one or more of the security hardening policies comprise one or more security hardening guidelines obtained from a provider of one or more of the resources, the one or more security hardening guidelines are included in the sub-object instances associated with the resource.

8. A method comprising:

obtaining, using executable instructions stored in a non-transitory medium and executed on at least one processor, a computing system object instance of a computing system, the computing system object instance comprising one or more sub-object instances corresponding to a resources of the computing system;

obtaining, using the executable instructions, security hardening policies associated with an established security hardening standard;

generating a structured name for each security hardening policy having a hierarchal structure based upon one or more criteria associated with a type of the resource;

modifying, using the executable instructions, one or more of the sub-object instances to include the security hardening policies that are associated with those sub-object instances to form a security hardening-based object instance; and determine, using the executable instructions, whether a configuration of the resources meets the security hardening policy using the security hardening-based object instance for each security hardening policy.

9. The method of claim 8, further comprising importing the security hardening policies from at least one of a database, a persistent data store, and a spreadsheet program.

10. The method of claim 9, further comprising importing the security hardening policies as an extensible markup language (XML) formatted file.

11. The method of claim 8, further comprising perform a discovery operation to obtain configuration information about the resources in the computing system, and create the integrated computing system object instance using the obtained configuration information.

12. The method of claim 8, further comprising obtain configuration information from a computing system management application.

13. The method of claim 8, further comprising obtain the computing system object instance from an integrated computing system design tool, wherein the integrated computing system has not yet been fabricated.

14. The method of claim 8, further comprising obtaining one or more of the security hardening policies comprising one or more security hardening guidelines obtained from a provider of one or more of the resources, the one or more security hardening guidelines are included in the sub-object instances associated with the resource.

15. A non-transitory, computer readable medium that when executed by at least one processor, is operable to perform at least the following:

obtaining a computing system object instance of a computing system, the computing system object instance comprising one or more sub-object instances corresponding to a resources of the computing system;

obtaining security hardening policies associated with an established security hardening standard, wherein one or more of the security hardening policies are each associated with a structured name having a hierarchal structure based upon one or more criteria associated with a type of the resource;

modifying one or more of the sub-object instances to include the security hardening policies that are associated with those sub-object instances to form a security hardening-based object instance; and determine whether a configuration of the resources meets the security hardening policy using the security hardening-based object instance for each security hardening policy.

16. The non-transitory, computer readable medium of claim 15, further operable to perform importing the security hardening policies from a spreadsheet program as an extensible markup language (XML) formatted file.

17. The non-transitory, computer readable medium of claim 15, further operable to perform a discovery operation to obtain configuration information about the resources in the computing system, and create the computing system object instance using the obtained configuration information.

18. The non-transitory, computer readable medium of claim 15, further operable to perform obtaining one or more of the security hardening policies comprising one or more security hardening guidelines obtained from a provider of the resources, the one or more security hardening guidelines are included in the one or more of the sub-object instances associated with the resources.

* * * * *